United States Patent [19]

Schainbaum

[11] 3,753,109

[45] Aug. 14, 1973

[54] PEAK DETECTOR

[75] Inventor: Julius Schainbaum, Philadelphia, Pa.

[73] Assignee: Smith Kline & French Laboratories, Philadelphia, Pa.

[22] Filed: Mar. 8, 1971

[21] Appl. No.: 121,734

[52] U.S. Cl. .............................. 324/103 P, 328/135
[51] Int. Cl. ........................................... G01r 19/16
[58] Field of Search .................... 324/103 R, 103 P, 324/102, 77 A; 328/135, 150, 151; 307/235; 73/23 R

[56] References Cited
UNITED STATES PATENTS

| | | | |
|---|---|---|---|
| 3,225,213 | 12/1965 | Hinrichs et al. ..................... | 328/151 |
| 3,412,330 | 11/1968 | Klaver ............................. | 324/103 R |
| 2,845,597 | 7/1958 | Perkins ........................... | 324/103 P |
| 3,221,253 | 11/1965 | Keyes ............................. | 324/103 P |

Primary Examiner—Rudolph V. Rolinec
Assistant Examiner—Ernest F. Karlsen
Attorney—Smith, Harding, Earley & Follmer

[57] ABSTRACT

Circuitry is provided for distinguishing peaks in the amplitude of a time-varying signal. The circuitry includes a peak follower comprising a capacitor charged through a diode for storing peak values of the signal. A valley detection circuit is provided for resetting the peak follower following the occurrence of a valley in the signal. This prepares the peak follower for a new peak. A peak is determined to have occurred when the signal drops to an amplitude which is less than a predetermined percentage of the amplitude stored in the capacitor. The percentage is made to drop drastically at low signal levels to prevent noise from resulting in false indications of peaks.

2 Claims, 2 Drawing Figures

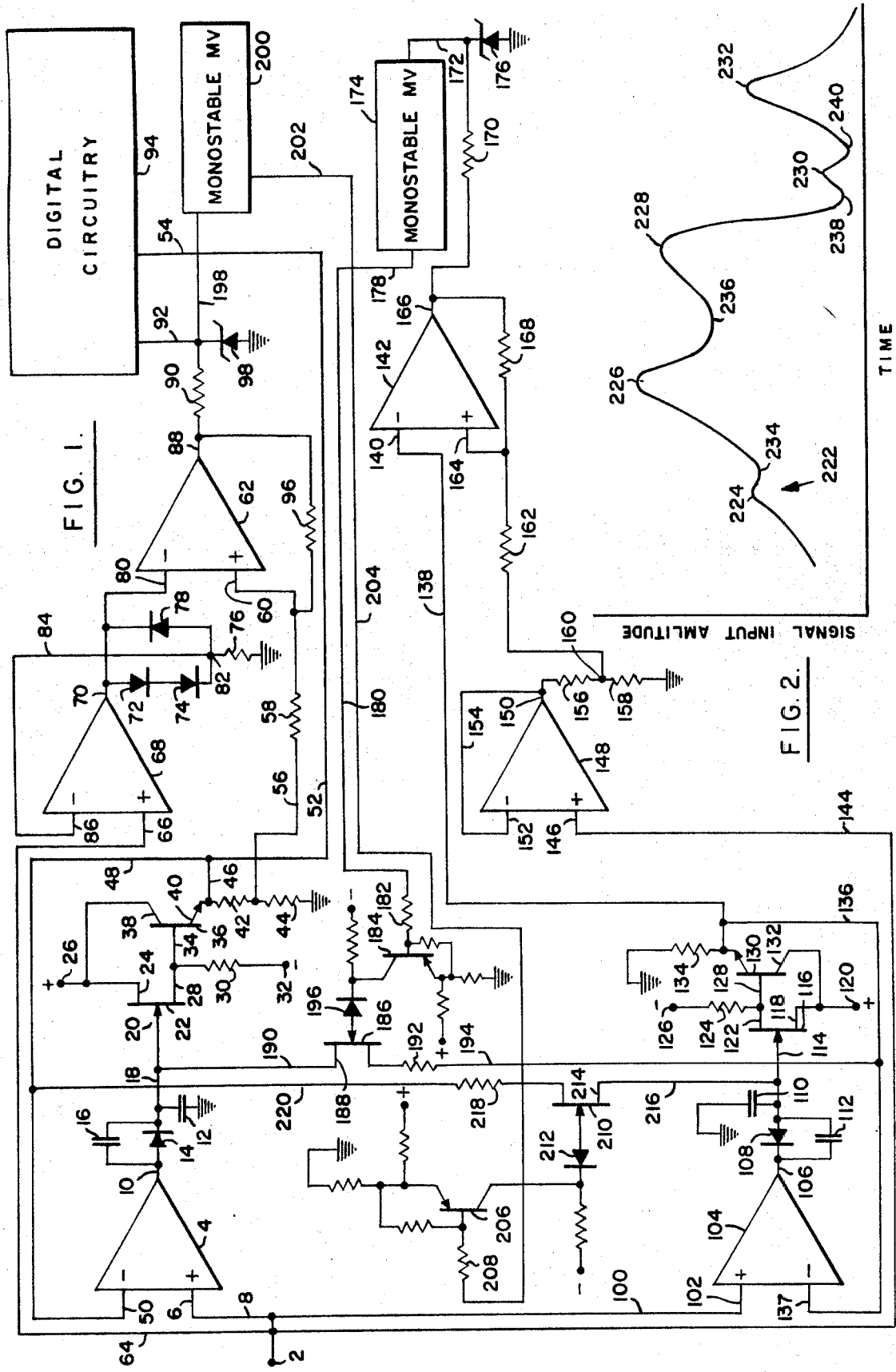

PEAK DETECTOR

BRIEF SUMMARY OF THE INVENTION

This invention relates to peak detection circuitry and particularly to circuitry adapted to be used in conjunction with an automatic analyzer of the kind used in clinical chemistry or any other apparatus which provides one or more outputs having time-varying amplitudes, where it is important to determine the existence of peaks, peak amplitudes, peak positions (in time), integrals under peaks, the number of peaks, or other parameters of the signal involving the detection of peaks. The invention is particularly applicable to automatic analyzers, particle counters, and other instruments having outputs in the form of signals having successively occurring peaks. It will be particularly described in its application to an automatic analyzer.

Automatic analyzers are generally used in hospital laboratories to make inexpensive but comprehensive chemical analyses of blood and urine. A multiple-channel output is usually provided, each channel corresponding to one of a number of different tests. The tests may be, for example, colorimetric, chromatographic or photometric. A typical multiple-channel automatic analyzer is described in U.S. Pat. No. 3,419,879, issued Dec. 31, 1968, to Milton H. Pelavin.

Automatic analyzers of the type just mentioned generally handle small samples sequentially. The output in any channel is generally in the form of a continuously varying current, the amplitude of which reaches a peak for each sample. In a typical system, it is the amplitude of the peak for a given sample which is of interest.

Ordinarily, the multiple-channel output is fed to a multiple-trace chart recorder. Each trace corresponds to a channel, and provides a record of one parameter of the samples being tested. In practice, the chart recorder is usually provided with one or more slave potentiometers for producing electrical outputs corresponding to the positions of the pens on the chart recorder. The potentiometer outputs are fed to a computer which determines the peak intensity for each sample.

Particularly in research, as contrasted with quality control operations, successive samples have widely varying parameters. In an apparatus measuring a rapid succession of samples, one result of this wide variance is that the signal in an output channel may not return to a constant base line following each peak. Rather, it is more likely to drop varying distances toward the base line before resuming a climb toward the next peak. Heretofore, unless synchronization were provided between the sample-introducing means, and the peak detecting means, the determination of the existence of peaks in such an output would require the setting of a relatively high threshold for the determination of the existence of a peak. If the amplitude rises above the threshold, a peak is determined to exist. Such an arrangement is quite satisfactory where valleys between peaks are generally at the same level and thereby define a base line. However, where the valleys are at widely different levels, the systems involving a fixed threshold fail. Such failure is exemplified by the fact that two peaks separated by a valley which is above the threshold would be detected as one. This result could only be avoided by raising the threshold, in which case peaks of relatively low amplitude would not be detected.

In accordance with this invention, these problems are overcome by using a peak follower which is arranged to be reset by valley detection circuitry whenever a valley occurs. No threshold is used, no synchronization is needed, and the difficulties just mentioned are eliminated.

A peak is determined to have occurred when the signal level falls to a value which is a predetermined fraction of the previously existing maximum retained by the peak follower. This method of determining the existence of a peak, unlike the threshold method, is subject to a problem, namely the sensitivity of the detection circuitry to noise. At low signal levels, if the same fraction is retained as a criterion for determining that a peak has occurred, small signal variations which are due to noise could produce a false indication of a peak. In accordance with the invention, means are provided for reducing the fraction following the occurrence of any relatively low maximum.

The principal object of this invention is the provision of a simple peak detection circuit which is capable of following signals having widely varying valley levels.

Another object is to eliminate the need for means, independent of the signal, such as synchronization circuitry in a successive-sample automatic instrument, for determining a time at which or a period of time in which a peak will occur. The invention is not only applicable to eliminate synchronization in successive-sample instruments in which peaks occur at predictable times, but is also applicable to signals having peaks occurring at unpredicted or unpredictable times.

Another object is to provide peak detection circuitry capable of indicating the existence of all true peaks in a signal of widely varying amplitudes.

Another object is to prevent the occurrence of false peak indications resulting from noise at low signal levels.

A still further object of the invention is to provide peak detection circuitry which is specially adapted to be associated with digital read-out circuitry, and which is specially adapted for connection to multiplex circuitry.

BRIEF DESCRIPTION OF THE DRAWINGS

FIG. 1 is a schematic diagram of the peak detection circuitry in accordance with the invention; and, FIG. 2 is a plot of the amplitude of a typical input signal against time.

DETAILED DESCRIPTION

FIG. 1 shows a data input terminal 2 which is provided for connection to the output of an analyzer or to an output channel of a multiple channel analyzer. Normally, a filter (not shown) is provided between the analyzer and input terminal 2. Terminal 2 is connected to a non-inverting input 6 of operational amplifier 4 through line 8. The output 10 of the operational amplifier is connected to capacitor 12 through diode 14. The other terminal of the capacitor is grounded. The diode is arranged in a direction so that the capacitor charges when the output of the amplifier is more positive than the voltage across the capacitor.

A small capacitor 16 is connected in parallel with diode 14.

Line 18 connects the junction of diode 14 and capacitor 12 with the gate 20 of an n-channel field-effect transistor (FET) 22. Drain 24 is connected to a positive supply terminal 26. The source 28 is connected through a resistor 30 to negative supply terminal 32, and is connected through line 34 to the base of NPN transistor 36. The collector 38 is connected to positive terminal 26. The emitter 40 is connected through resistors 42 and 44 in series to ground. These resistors constitute a voltage dropping network. Resistor 42 is typically 470 ohms, and resistor 44 is typically 6,800 ohms. Thus, the voltage in line 56, which connects to the junction between these resistors, is a relatively high percentage of the voltage at the emitter, say 90 percent, taking into account other current paths in the circuitry.

Emitter 40 is connected through lines 46 and 48 to the inverting input 50 of operational amplifier 4. Emitter 40 is also connected through line 46 and line 52 to input 54 of digital circuitry 94. The digital circuitry may be any circuitry which is capable of reading out the value of the signal in line 52 upon command.

The junction of resistors 42 and 44 is connected through line 56 and resistor 58 to the non-inverting input 60 of high-gain DC amplifier 62. This is the amplifier which is used to compare a fraction of a maximum with the input signal level to determine the existence of a peak. The data input terminal 2 is connected through line 64 to the non-inverting input 66 of operational amplifier 68. The output 70 of amplifier 68 is connected through diodes 72 and 74 to ground. A single diode 78 is connected across diodes 72 and 74, but in the opposite direction, for the purpose of clamping input 80. Output terminal 70 of amplifier 68 is connected to the inverting input 80 of amplifier 62. Junction 82, the junction of diode 72 with resistor 76, is connected through line 84 to the inverting input 86 of amplifier 68.

Output 88 of amplifier 62 is connected through resistor 90 to command input 92 of digital circuitry 94. Typically, the digital circuitry involves multiplexing circuitry for receiving a plurality of inputs including input 54 and a number of command inputs including the input at 92. These triggering inputs indicate to the digital circuitry that a particular peak detection circuit has detected a peak the amplitude of which may be read out.

A Zener diode 98 is connected between input 92 and ground to limit the signal level at input 92. Resistor 96 is connected between output 88 and input 60 of amplifier 62.

The data input terminal 2 is connected through line 100 to inverting input 102 of operational amplifier 104. Its output 106 is connected through diode 108 to one terminal of capacitor 110. The other terminal of the capacitor is grounded. Diode 108 has its cathode connected to output 106, and therefore allows capacitor 110 to discharge only when output 106 is more negative than the voltage across the capacitor, but prevents charging of the capacitor when output 106 becomes more positive than the voltage across the capacitor. The charge on capacitor 110 thus represents the minimum value of the signal at input 2 following the last previous resetting of capacitor 110.

A small capacitor 112 is connected across the diode. The junction between diode 108 and capacitor 110 is connected through line 114 to the gate of FET 116. The drain 118 is connected to positive supply terminal 120 and the source 122 is connected through resistor 124 to negative supply terminal 126. The source is also connected through line 128 to the base of NPN transistor 130. The collector 132 is connected to positive terminal 120. The emitter is connected through resistor 134 to ground, and through line 136 to the inverting input 137 of amplifier 104.

The emitter of transistor 130 is also connected through line 138 to the inverting input 140 of high-gain DC amplifier 142. This amplifier acts as a comparator to determine the existence of a valley in much the same way as amplifier 62 acts to determine the existence of a peak.

Terminal 2 is connected through line 144 to non-inverting input 146 of operational amplifier 148. Its output 150 is connected to inverting input 152 through line 154. The output is also connected to ground through resistors 156 and 158 in series. Resistor 156 is typically 470 ohms and resistor 158 is 6,800 ohms.

Junction 160 between resistors 156 and 158 is connected through resistor 162 to non-inverting input 164 of amplifier 142. Output 166 is connected through resistor 168 to input 164. This output is also connected through resistor 170 and line 172 to the input of a monostable multivibrator 174. Input 172 is connected to ground through Zener diode 176. The output 178 of multivibrator 174 is connected through line 180 and resistor 182 to the base of PNP transistor 184. Transistor 184 is connected to drive FET 186. Drain 188 is connected to line 18 through line 190. The source is connected through resistor 192 and line 194 to line 136.

Transistors 184 and 186 are parts of the switching circuitry for resetting the peak following circuit. When multivibrator 174 produces an output pulse, FET 188 conducts for a short period of time and discharges capacitor 12 approximately to the potential then in line 136, which represents the minimum stored in capacitor 110. A diode 196 is connected in the gate circuit of FET 186 with its anode connected to the gate.

The valley detecting circuitry comprising amplifier 104 and transistors 116 and 130 must also be reset between valleys, and this is accomplished by circuitry similar to that used to reset the peak follower. The junction between resistor 90 and input 92 is connected through line 198 to the input of monostable multivibrator 200. The output 202 of multivibrator 200 is connected through line 204 and resistor 208 to the base of PNP transistor 206. Transistor 206 is connected to drive FET 210, which has diode 212 in its gate circuit. Drain 214 is connected through line 216 to the ungrounded terminal of capacitor 110. The source of FET 210 is connected through resistor 218 and line 220 to line 48. Thus, whenever a resetting signal is provided in line 204, FET 210 conducts for a short time and charges capacitor 110 so the voltage across capacitor 110 approaches the level of the voltage then in line 48 which represents the peak last stored in the peak follower. Capacitor 110 charges to a high positive value upon resetting, and its charge follows a negative slope of the signal, but not a positive slope. Thus, its charge and the output in line 138, following resetting, represent the minimum value of the signal following resetting.

The circuitry including amplifier 4, capacitor 12 and transistors 22 and 36 constitutes a peak follower in which the capacitor stores a representation of the maximum value of the input in the period of time between resetting signals generated by the valley detecting circuitry. The output voltage at emitter 40 is also representative of the maximum value of the input as is the voltage in line 56. Each of these voltages is unique for each possible maximum of the input signal at terminal 2 within the range of interest.

Resetting is accomplished by connecting capacitor 12 to line 136 through FET 186. Resetting is triggered by the valley detecting circuitry comprising amplifier 104, capacitor 110, transistors 116 and 130, amplifier 148, and comparator 142. Since line 136 is at the valley potential, the potential at the ungrounded terminal of capacitor 12 approaches this level during the reset interval established by multivibrator 174.

While a representation of the maximum level between resettings is maintained at output 54 of the peak follower, a voltage corresponding to a fraction of that maximum appears in line 56. The fraction is determined principally by the values of resistors 42 and 44 and typically lies at about 90 percent. An analysis of the operation of amplifier 68 and its associated circuitry will show that the signal at inverting input 80 of amplifier 62 is a voltage approximately equal to the sum of the voltage at input 66 of amplifier 68 and the forward voltage drops of diodes 72 and 74. At relatively high signal levels, the diode voltage drop is so small compared to the signal at input 66 as to be negligible. Thus, amplifier 62 compares what is effectively the input signal with 90 percent of the maximum retained by the peak follower. However, when the signal level at input 66 is low, the diode voltage drops become significant, and the comparison by amplifier 62 is between 90 percent of the retained maximum, on the one hand, and the input signal plus the sum of the diode voltage drops on the other. In effect, the comparison is between the input signal level on the one hand and a much smaller fraction than 90 percent of the retained maximum. The result is that even though the detection of a peak is accomplished by the comparison of the input signal by a fraction of the retained maximum, the apparatus is much less likely to produce false indications of peaks at low signal levels. A greater percentage reduction in the input signal below the retained maximum is required at low levels than is required at high signal levels. The signal at input terminal 2 typically varies between 0 and +10 volts, and output 70 of amplifier 68 also varies between 0 and +10 volts. The forward voltage drop of each of diodes 72 and 74 is typically 0.4 volts.

Diodes 72 and 74 in effect provide a fixed voltage which increases the level of the electrical input signal relative to the value of the representation of the maximum stored in the peak follower. This is accomplished directly by adding a fixed voltage to the input signal. Alternatively the same result could be accomplished by subtraction of a fixed voltage from the stored representation of the maximum. This could be accomplished by inserting a diode in series with resistor 42 above the junction with line 56.

The existence of a valley is determined by a comparison made by amplifier 142. The comparison is between a fraction, say 90 percent, of the valley signal with the level of the retained minimum. When the signal level begins to increase following a minimum, eventually approximately 90 percent of that level is equal to the retained minimum. At that point, the swing in polarity of output 166 of amplifier 142 causes triggering of multivibrator 174 resulting in resetting of the peak follower.

Since line 18 is connected through FET 186 to line 136, which is at the valley level, capacitor 12 is discharged to a voltage less than the present signal level at the time of discharge. A similar situation holds true with respect to discharge of capacitor 110 in the valley detection circuitry, that is, on resetting, the voltage across capacitor 110 is brought to a value more positive than the present signal level.

The operation of the apparatus will be summarized with reference to FIG. 2 which is a plot 222 with signal input amplitude as the ordinate and time as the abscissa. Maxima are indicated at 224, 226, 228, 230 and 232. Minima are indicated at 234, 236, 238, and 240.

Proceeding from left to right, maximum 224 is not identified as a peak because the minimum 234 following it is at a level greater than 90 percent of the amplitude of maximum 224.

Minimum 234 is not identified as a valley because capacitor 110 in the valley detection circuitry is storing a minimum at a still lower level.

Maximum 226 is identified as a peak since, following it, the signal level drops to a value which is less than 90 percent of the maximum 226.

Minimum 236 is identified as a minimum since, following it, the signal rises to a value such that 90 percent of the signal is at least equal to the level of the minimum. The peak follower is reset at this time.

Maximum 228 is identified as a peak since the signal level following it falls to a level below 90 percent of the maximum.

Minimum 238 is identified as a valley because, following it, the signal rises to a level such that 90 percent of the signal is greater than the amplitude of minimum 238. The peak follower is again reset.

Maximum 230 is followed by a drop to a level which is about 50 percent of the amplitude of maximum 230. Such a drop, however, may be caused by mere noise at the low signal levels involved. The diode circuitry associated with amplifier 68 prevents maximum 230 from being identified as a peak.

Minimum 240 is identified as a valley, because it is lower than valley 238 and another resetting of the peak follower takes place.

Maximum 232 is detected as a peak.

Thus, maxima 226, 228, and 232 are identified as peaks while maxima 224 and 230 are not so identified. Note that a threshold in accordance with the prior art sufficiently high to allow separate identification of peaks 226 and 228 would be too high to allow identification of peak 232. On the other hand, if the threshold were low enough to allow peak 232 to be identified, peaks 226 and 228 would be identified as only one peak.

The apparatus produces a command signal at input 92 for the digital circuitry and produces an output in line 52 from which the peak values may be read upon command.

The apparatus is particularly suitable for applications involving multiplexing because, when a peak is found, it is held until a valley is detected. This allows time for a scanner to read out the peak amplitude.

I claim:

1. The new use, for analysis of data represented by a time-varying signal the amplitude of which at all times in the duration of the signal is an analog of the same variable component of said data, of an apparatus for determining the occurrence of peaks in a signal comprising means receiving said signal and storing a representation of the maximum value of said signal in a period of time, means determining maxima in the value of said signal and providing an indication of a peak when a maximum is detected, means for detecting minima in the value of said signal and providing a resetting signal for each detected minimum, and means responsive to said resetting signal for resetting said receiving and storing means to a condition wherein it is capable of storing a representation of the next maximum, said new use comprising:
 a. introducing said time-varying signal into said apparatus as the signal involved,
 b. deriving from said apparatus an analog signal corresponding in magnitude to the last-stored maximum,
 c. deriving from the apparatus a command signal after a maximum is detected but before the receiving and storing means is reset, and
 d. recording the analog signal in response to said command signal.

2. The new use, for analysis of data represented by a time-varying signal the amplitude of which at all times in the duration of the signal is an analog of the same variable component of said data, of an apparatus for determining the occurrence of peaks in a signal comprising means receiving said signal and storing a representation of the maximum value of said signal in a period of time, means determining maxima in the value of said signal and providing an indication of a peak when a maximum is detected, means for detecting minima in the value of said signal and providing a resetting signal for each detected minimum, and means responsive to said resetting signal for resetting said receiving and storing means to a condition wherein it is capable of storing a representation of the next maximum, said new use comprising:
 a. introducing said time-varying signal into said apparatus as the signal involved,
 b. deriving from said apparatus an analog signal corresponding in magnitude to the last-stored maximum,
 c. deriving from the apparatus a command signal when said indication is provided, and
 d. recording the analog signal in response to said command signal.

* * * * *